US 7,026,423 B2

(12) United States Patent
Gunatillake et al.

(10) Patent No.: US 7,026,423 B2
(45) Date of Patent: *Apr. 11, 2006

(54) SILICON-BASED POLYCARBONATES

(75) Inventors: Pathiraja A. Gunatillake, Mulgrave (AU); Gordon Francis Meijs, Murrumbeena (AU)

(73) Assignee: Aortech Biomaterials Pty Ltd., (AU)

( * ) Notice: Subject to any disclaimer, the term of this patent is extended or adjusted under 35 U.S.C. 154(b) by 48 days.

This patent is subject to a terminal disclaimer.

(21) Appl. No.: 10/219,732

(22) Filed: Aug. 14, 2002

(65) Prior Publication Data

US 2003/0092864 A1 May 15, 2003

Related U.S. Application Data

(63) Continuation of application No. 09/424,492, filed as application No. PCT/AU98/00375 on May 20, 1998, now abandoned.

(30) Foreign Application Priority Data

May 26, 1997 (AU) .................................. PO7002

(51) Int. Cl.
C08G 18/61 (2006.01)
C08G 18/44 (2006.01)

(52) U.S. Cl. .......................... 528/28; 528/25; 528/29; 525/464; 525/467; 525/474

(58) Field of Classification Search ............... 525/464, 525/467, 474; 528/25, 28, 29
See application file for complete search history.

(56) References Cited

U.S. PATENT DOCUMENTS

| 3,819,744 | A | 6/1974 | Buchner et al. ......... 260/824 R |
| 4,465,721 | A | 8/1984 | McAlister ..................... 528/86 |
| 4,861,830 | A | 8/1989 | Ward, Jr. ....................... 525/92 |
| 5,112,925 | A | 5/1992 | Horlacher et al. ............ 525/474 |
| 5,430,121 | A | 7/1995 | Pudleiner et al. .............. 528/28 |
| 5,504,177 | A | 4/1996 | King, Jr. et al. ............... 528/29 |
| 5,616,674 | A | 4/1997 | Michel et al. .................. 528/29 |
| 5,863,627 | A | 1/1999 | Szycher et al. ............. 428/36.8 |
| 6,313,254 | B1 | 11/2001 | Meijs et al. |
| 6,627,724 | B1* | 9/2003 | Meijs et al. .................... 528/26 |
| 6,858,680 | B1* | 2/2005 | Gunatillake et al. ........ 525/474 |

FOREIGN PATENT DOCUMENTS

| EP | 0216106 A | 4/1987 |
| EP | 0857746 A1 | 8/1998 |
| JP | 07048431 | * 2/1995 |
| JP | 07150478 | * 6/1995 |
| WO | WO98/07773 | 2/1998 |
| WO | WO98/13405 | 4/1998 |

OTHER PUBLICATIONS

"Japanese Abstract for JP 05200827A", (1993),2 pages.
"Japanese abstract for JP06100684-A", (1994),1 page.

* cited by examiner

*Primary Examiner*—David J. Buttner
(74) *Attorney, Agent, or Firm*—Schwegman, Lundberg, Woessner & Kluth, P.A.

(57) ABSTRACT

A silicon-based polycarbonate of formula (I):

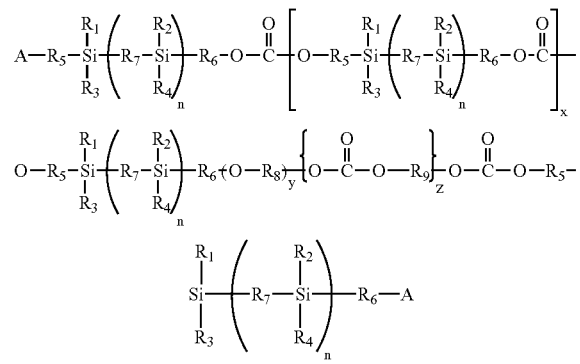

wherein $R_1$, $R_2$, $R_3$, $R_4$, $R_5$, $R_6$, $R_8$ and $R_9$ are the same or different and selected from hydrogen or an optionally substituted straight chain, branched or cyclic, saturated or unsaturated hydrocarbon radical; $R_7$ is a divalent linking group or an optionally substituted straight chain, branched or cyclic, saturated or unsaturated by hydrocarbon radical; A is an endcapping group; n, y and z are integers of 0 or more; and x is an integer of 0 or more.

12 Claims, No Drawings

SILICON-BASED POLYCARBONATES

RELATED APPLICATIONS

This application is a continuation of U.S. Ser. No. 09/424,492 filed Mar. 2, 2000, now abandoned, which was filed under 35 USC 371 based on International Application No. PCT/AU98/00375 filed May 20, 1998 and published in English on Dec. 3, 1998 as WO 98/54242, which claimed priority from Australian Application No. PO 7002 filed May 26, 1997, which applications and publication are incorporated herein by reference.

The present invention generally relates to silicon-based polycarbonates, processes for their preparation and their use in the synthesis of copolymers, in particular segmented copolymers such as polyurethanes for biomedical applications.

Segmented copolymers typically derive good mechanical properties from the separation of microphases caused by immiscibility of the segments. For example, it is known that in thermoplastic polyurethane elastomers, the so-called "hard" and "soft" segments have limited miscibility and separate to form microdomains. Many of the properties of polyurethane elastomers can be rationalised in terms of a semi-crystalline hard domain providing a reinforcement or filler-like effect within a soft matrix. The soft matrix or domain, most frequently comprises a poly(alkylene ether) or polyester chain of molecular weight within the range of about 500 to 2000. Such short polymer chains are generally terminated with hydroxyl groups and known as "macrodiols".

The structure of the macrodiol plays a significant role in determining the performance of the segmented copolymer. Polyester-based macrodiols generally give good mechanical properties, but poor resistance to degradation in harsh environments experienced in for example marine and biomedical applications.

Polyether macrodiols offer enhanced stability, but are not suitable for the synthesis of extremely soft materials, particularly when high stability is also required.

Polysiloxane-based polymers, especially polydimethyl siloxane (PDMS) exhibit characteristics such as low glass transition temperatures, good thermal, oxidative and hydrolytic stabilities and low surface energies. These properties would be desirable in the macrodiol-derived component of a segmented copolymer. In addition, they display good compatibility with biological tissues and fluids and low toxicity. For these reasons, PDMS has found particular application in the construction of medical devices, especially implantable devices. However, polymers derived from PDMS do not generally exhibit good tensile properties such as flexural strength or abrasion resistance.

Considerable efforts have gone into finding a means for incorporating low molecular weight PDMS segments into segmented copolymers such as polyurethanes. These efforts have mainly focussed on achieving clarity, processability and a good balance of mechanical properties[1]. However, no completely successful attempts have been disclosed. Speckhard et al[2] have indicated that as a result of large differences in solubility parameters of PDMS and most conventional hard segments, PDMS-based polyurethanes are likely to be highly phase separated materials characteristic of poor mechanical properties. As a result of this large difference in polarity between hard and soft segments, it is anticipated that premature phase separation occurs during synthesis and there is compositional heterogeneity and overall low molecular weight. In addition, there appears to be an optimal degree of mixing at the interface between soft and hard domains, with extremely sharp interfaces leading to a low degree of mechanical coupling between the two domains and resulting poor strength. Thus it is understood that, for example, PDMS-based polyurethanes generally exhibit poor mechanical properties. Typically, the tensile strength and elongation at break are about 7 MPa and 200%, respectively[2].

Polycarbonate macrodiols have also been used as reactive ingredients in the synthesis of block and segmented copolymer systems, in particular high performance polyurethanes. Processes for preparing polycarbonate macrodiols based on a range of bishydroxy alkylene compounds are disclosed in JP 62,241,920 (Toa Gosei Chemical Industry Co. Ltd.), JP 64,01,726 (Dainippon Ink and Chemicals, Inc.), JP 62,187,725 (Daicel Chemical Industries, Ltd.) DE 3,717,060 (Bayer A. G.), U.S. Pat. No. 4,105,641 (Bayer Aktiengesellschaft), U.S. Pat. No. 4,131,731 (Beatrice Foods Company) and U.S. Pat. No. 5,171,830 (Arco Chemical Technology).

The most common alkylenediol described in these patent specifications is 1,6-hexanediol.

Although polycarbonate macrodiols are generally classified under polyesters, the corresponding polyurethanes exhibit hydrolytic stabilities comparable or in some cases superior to polyetherurethanes[3]. They also possess high tensile strength and toughness. These properties are attributed to the high level of phase mixing, promoted by intermolecular hydrogen bonding involving the hard segment urethane hydrogens and the carbonate functional groups of the soft segment. The hydrogen bonding is also partly responsible for the relatively poor elastomeric properties such as low flexibility and high durometer hardness of polyurethanes based on polycarbonate macrodiols. These properties are in contrast to those of the non polar macrodiol based polyurethanes, such as those based on siloxanes.

A requirement accordingly exists to develop silicon-based macrodiols for use as building blocks of segmented copolymers such as polyurethanes with structural features that allow good compatibility and mechanical properties. Suitable macrodiols would retain the advantages of silicon-based polymers such as flexibility, low temperature performance, stability and in some cases biocompatibility. The disadvantages of poor mechanical properties will preferably be avoided so that the silicon-based macrodiols can form part of materials which can be used in various demanding applications, particularly the biomedical field.

According to one aspect of the present invention there is provided a silicon-based polycarbonate of the formula (I):

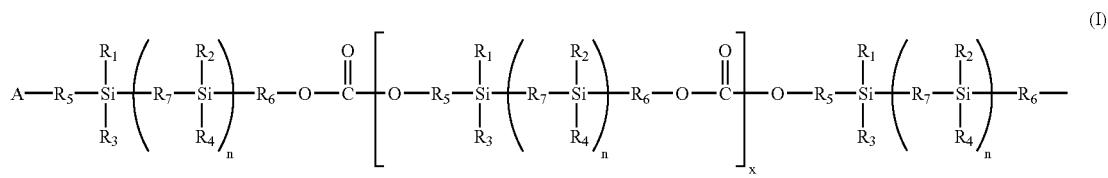

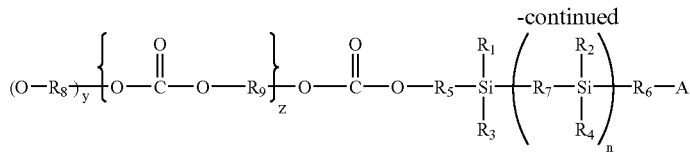

wherein $R_1$, $R_2$, $R_3$, and $R_4$ are the same or different and can be hydrogen or an optionally substituted straight chain, branched or cyclic, saturated or unsaturated hydrocarbon radical;

$R_5$, $R_6$, $R_8$ and $R_9$ are the same or different and can be an optionally substituted straight chain, branched or cyclic, saturated or unsaturated hydrocarbon radical;

$R_7$ is a divalent linking group or an optionally substituted straight chain, branched or cyclic, saturated or unsaturated hydrocarbon radical;

A is an endcapping group;

n, y and z are integers of 0 or more; and x is an integer of 0 or more.

The hydrocarbon radical for substituents $R_1$, $R_2$, $R_3$ and $R_4$ may include alkyl, alkenyl, alkynyl, aryl or heterocyclyl radicals. It will be appreciated that the equivalent radicals may be used for substituents $R_5$, $R_6$, $R_7$, $R_8$ and $R_9$ except that the reference to alkyl, alkenyl and alkynyl should be to alkylene, alkenylene and alkynylene, respectively. In order to avoid repetition, only detailed definitions of alkyl, alkenyl and alkynyl are provided hereinafter.

The term "alkyl" denotes straight chain, branched or mono- or poly-cyclic alkyl, preferably $C_{1-12}$ alkyl or cycloalkyl. Examples of straight chain and branched alkyl include methyl, ethyl, propyl, isopropyl, butyl, isobutyl, sec-butyl, amyl, isoamyl, sec-amyl, 1,2-dimethylpropyl, 1,1-dimethylpropyl, pentyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyloctyl, 1-, 2-, 3-, 4- or 5-ethylheptyl, 1-, 2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3-, or 4-propylheptyl, undecyl 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3- or 4-butyloctyl, 1,2-pentylheptyl and the like. Examples of cyclic alkyl include cyclopropyl, cyclobutyl, cyclopentyl, cyclohexyl, cycloheptyl, cyclooctyl, cyclononyl and cyclodecyl and the like.

The term "alkenyl" denotes groups formed from straight chain, branched or mono- or poly-cyclic alkenes including ethylenically mono- or poly-unsaturated alkyl or cycloalkyl groups as defined above, preferably $C_{2-12}$ alkenyl. Examples of alkenyl include vinyl, allyl, 1-methylvinyl, butenyl, isobutenyl, 3-methyl-2-butenyl, 1-pentenyl, cyclopentenyl, 1-methyl-cyclopentenyl, 1-hexenyl, 3-hexenyl, cyclohexenyl, 1-heptenyl, 3 heptenyl, 1-octenyl, cyclooctenyl, 1-nonenyl, 2-nonenyl, 3-nonenyl, 1-decenyl, 3-decenyl, 1,3-butadienyl, 1,4-pentadienyl, 1,3-cyclopentadienyl, 1,3-hexadienyl, 1,4-hexadienyl, 1,3-cyclohexadienyl, 1,4-cyclohexadienyl, 1,3-cycloheptadienyl, 1,3,5-cycloheptatrienyl, 1,3,5,7-cycloocta-tetraenyl and the like.

The term "alkynyl" denotes groups formed from straight chain, branched, or mono- or poly-cyclic alkynes. Examples of alkynyl include ethynyl, 1-propynyl, 1- and 2-butynyl, 2-methyl-2-propynyl, 2-pentynyl, 3-pentynyl, 4-pentynyl, 2-hexynyl, 3-hexynyl, 4hexynyl, 5-hexynyl, 10-undecynyl, 4-ethyl-1-octyn-3-yl, 7-dodecynyl, 9-dodecynyl, 10-dodecynyl, 3-methyl-1-dodecyn-3-yl, 2-tridecynyl, 11-tridecynyl, 3-tetradecynyl, 7-hexadecynyl, 3-octadecynyl and the like.

The term "aryl" denotes single, polynuclear, conjugated and fused residues of aromatic hydrocarbons. Examples of aryl include phenyl, biphenyl, terphenyl, quaterphenyl, phenoxyphenyl, naphthyl, tetrahydronaphthyl, anthracenyl, dihydroanthracenyl, benzanthracenyl, dibenzanthracenyl, phenanthrenyl and the like.

The term "heterocyclyl" denotes mono- or poly-cyclic heterocyclyl groups containing at least one heteroatom selected from nitrogen, sulphur and oxygen. Suitable heterocyclyl groups include N-containing heterocyclic groups, such as, unsaturated 3 to 6 membered heteromonocyclic groups containing 1 to 4 nitrogen atoms, for example, pyrrolyl, pyrrolinyl, imidazolyl, pyrazolyl, pyridyl, pyrimidinyl, pyrazinyl, pyridazinyl, triazolyl or tetrazolyl; saturated 3 to 6-membered heteromonocyclic groups containing 1 to 4 nitrogen atoms, such as pyrrolidinyl, imidazolidinyl, piperidino or piperazinyl; unsaturated condensed heterocyclic groups containing 1 to 5 nitrogen atoms, such as, indolyl, isoindolyl, indolizinyl, benzimidazolyl, quinolyl, isoquinolyl, indazolyl, benzotriazolyl or tetrazolopyridazinyl; unsaturated 3 to 6-membered heteromonocyclic group containing an oxygen atom, such as, pyranyl or furyl; unsaturated 3 to 6-membered hetermonocyclic group containing 1 to 2 sulphur atoms, such as, thienyl; unsaturated 3 to 6-membered heteromonocyclic group containing 1 to 2 oxygen atoms and 1 to 3 nitrogen atoms, such as, oxazolyl, isoazolyl or oxadiazolyl; saturated 3 to 6-membered heteromonocyclic group containing 1 to 2 oxygen atoms and 1 to 3 nitrogen atoms, such as, morpholinyl; unsaturated condensed heterocyclic group containing 1 to 2 oxygen atoms and 1 to 3 nitrogen atoms, such as, benzoxazolyl or benzoxadiazolyl; unsaturated 3 to 6-membered heteromonocyclic group containing 1 to 2 sulphur atoms and 1 to 3 nitrogen atoms, such as thiazolyl or thiadiazolyl; saturated 3 to 6-membered heteromonocyclic group containing 1 to 2 sulphur atoms and 1 to 3 nitrogen atoms, such as, thiadiazolyl; and unsaturated condensed heterocyclic group containing 1 to 2 sulphur atoms and 1 to 3 nitrogen atoms, such as benzothiazolyl or benzothiadiazolyl.

In this specification, "optionally substituted" means that a group may or may not be further substituted with one or more groups selected from oxygen, nitrogen, sulphur, alkyl, alkenyl, alkynyl, aryl, halo, haloalkyl, haloalkenyl, haloalkynyl, haloaryl, hydroxy, alkoxy, alkenyloxy, alkynyloxy, aryloxy, carboxy, benzyloxy, haloalkoxy, haloalkenyloxy, haloalkynyloxy, haloaryloxy, nitro, nitroalkyl, nitroalkenyl, nitroalkynyl, nitroaryl, nitroheterocyclyl, azido, amino, alkylamino, alkenylamino, alkynylamino, arylamino, benzylamino, acyl, alkenylacyl, alkynylacyl, arylacyl, acylamino, acyloxy, aldehydo, alkylsulphonyl, arylsulphonyl, alkylsulphonylamino, arylsulphonylamino, alkylsulphonyloxy, arylsulphonyloxy, heterocyclyl, heterocycloxy, heterocyclylamino, haloheterocyclyl, alkylsulphenyl, arylsulphenyl, carboalkoxy, carboaryloxy, mercapto, alkylthio, arylthio, acylthio and the like.

Preferably z is an integer of 0 to about 50 and x is an integer of 1 to about 50. Suitable values for n include 0 to about 20, more preferably 0 to about 10. Preferred values for y are 0 to about 10, more preferably 0 to about 2.

The term "endcapping group" is used herein in its broadest sense and includes reactive functional groups or groups containing reactive functional groups. Suitable examples of reactive functional groups are alcohols, carboxylic acids, aldehydes, ketones, esters, acid halides, acid anhydrides, amines, imines, thio, thioesters, sulphonic acid and epoxides. Preferably the reactive functional group is an alcohol or an amine, more preferably an alcohol.

A preferred polycarbonate is a compound of the formula (I) wherein A is OH which is a polycarbonate macrodiol of the formula (1a):

(i) a silicon-based diol of the formula (II)

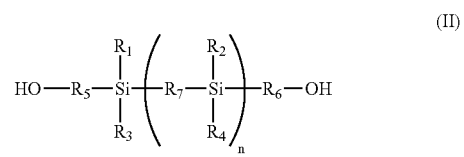

wherein $R_1$ to $R_7$ and n are as defined in formula (Ia) above; or (ii) the silicon-based diol of the formula (II) defined in (i) above and a non-silicon based diol of the formula (III):

wherein $R_9$ is as defined above in formula (Ia).

This process may be extended to the preparation of the silicon-based polycarbonate of the formula (I) by including the additional step of converting the hydroxyl groups in the macrodiol of the formula (1a) into other reactive functional groups. This conversion step can be achieved using procedures known in the art such as oxidation to give a dicarboxylic acid, conversion to an amine using the Gabriel

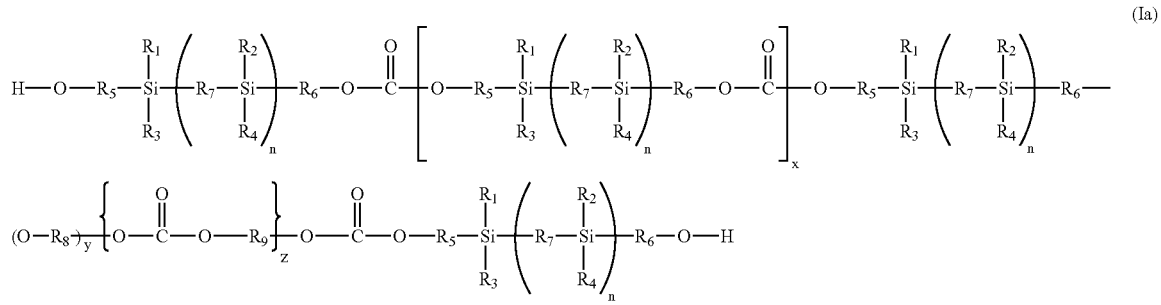

wherein $R_1$ to $R_6$, $R_8$, $R_9$, n, y, x and z are as defined in formula (I) above and $R_7$ is a divalent linking group or an optionally substituted straight chain, branched or cyclic, saturated or unsaturated hydrocarbon radical;

Suitable divalent linking groups for $R_7$ include O, S and NR wherein R is hydrogen or an optionally substituted straight chain, branched or cyclic, saturated or unsaturated hydrocarbon radical.

Particularly preferred polycarbonate macrodiols are compounds of the formula (Ia) wherein $R_1$, $R_2$, $R_3$ and $R_4$ are methyl, $R_8$ is ethyl, $R_9$ is hexyl, $R_5$ and $R_6$ are propyl or butyl and $R_7$ is O or —$CH_2$—$CH_2$—, more preferably $R_5$ and $R_6$ are propyl when $R_7$ is O and $R_5$ and $R_6$ are butyl when $R_7$ is —$CH_2$—$CH_2$—. The preferred molecular weight range of the polycarbonate macrodiol is about 400 to about 5000, more preferably about 400 to about 2000.

The present invention also provides a process for preparing the silicon-based polycarbonate macrodiol of the formula (1a) as defined above which includes reacting a source of carbonate with either:

procedure or reaction with an endcapping agent for example, diisocyanate, dicarboxylic acid, cyclic anhydride or the like.

The source of carbonate may be a carbonate compound or two or more reagents which when combined produce carbonate or a carbonate compound. It will be appreciated that the source of carbonate will include the $R_8$ substituent. Suitable carbonate compounds include cyclic carbonates such as alkylene carbonates for example ethylene or propylene carbonate and linear carbonates such as dialkyl or diaryl carbonates, for example, dimethyl carbonate, diethyl carbonate or diphenyl carbonate. Preferably the source of carbonate has a low molecular weight because of the ease of removal of the condensation by-product from the reaction mixture.

The silicon-based diols of the formula (II) may be obtained as commercially available products. For example 1,3-bishydroxypropyl-1,1,3,3-tetramethyldisiloxane and 1,3-bishydroxybutyl-1,1,3,3-tetramethyldisiloxane are available from Shin Etsu or Silar Laboratories. Others can be prepared by using the appropriate disilane compounds and hydroxy terminated olefinic compounds using a hydrosilylation reaction[4].

It will be appreciated that the diol of formula (II) can be used separately or as a mixture containing two or more structurally different diols in the preparation of the polycarbonates according to the present invention. The presence of silicon or siloxy radicals in the diol imparts hydrophobic and flexibility characteristics which results in improved elastomeric and degradation resistance in copolymers produced from these polycarbonates.

In another embodiment, non-silicon based diols of the formula (III) can be used in combination with the silicon-based diols of the formula (II) for the preparation of polycarbonates. Preferably, the non-silicon based diol is an aliphatic dihydroxy compound, such as, alkylene diols, for example, 1,4-butanediol, 1,6-hexanediol, diethyleneglycol, triethyleneglycol, 1,4-cyclohexanediol or 1,4-cyclohexanedimethanol. It has been found that when a silicon-containing diol and an alkylene diol are reacted, the resulting polycarbonate is generally a random copolycarbonate. Accordingly, polycarbonates having a broad range of properties can be prepared by choosing different ratios of the two diols.

The process for preparing the polycarbonate is preferably a transesterification similar to that described in U.S. Pat. No. 4,131,731 which is carried out in the presence of a transesterification catalyst. Examples of suitable catalysts include those disclosed in U.S. Pat. No. 4,105,641 such as stannous octoate and dibutyl tin dilaurate.

It will be appreciated that other processes may be used to prepare the polycarbonate of the present invention such as those described by Eckert et al[5] which are incorporated herein by reference. Some of these processes include reacting the source of carbonate and the diol of the formula (II) with either phosgene (ClCOCl) or chloroformates, for example, Cl—COO—R'—OCOCl wherein R' is a divalent linking group or an optionally substituted straight chain, branched or cyclic, saturated or unsaturated hydrocarbon radical.

The polycarbonate of the present invention may be used in the preparation of copolymers such as copolyesters, copolyethercarbonates, copolyamides, copolyimides or segmented copolymers for example polyurethane or polyurethane urea elastomers.

Thus, the present invention further provides a copolymer which includes a silicon-based polycarbonate segment of the formula (Ib):

According to a still further aspect of the present invention there is provided a polyurethane elastomeric composition which includes a silicon-based polycarbonate segment of the formula (Ib) defined above where $R_7$ is a divalent linking group or an optionally substituted straight chain, branched or cyclic, saturated or unsaturated hydrocarbon radical.

The polyurethane elastomeric compositions of the present invention may be prepared by any suitable known technique. A preferred method involves mixing the polycarbonate and a chain extender and then reacting this mixture with a diisocyanate. The initial ingredients are preferably mixed at a temperature in the range of about 45 to about 100° C., more preferably about 60 to about 80° C. If desired, a catalyst such as dibutyl tin dilaurate at a level of about 0.001 to about 0.5 wt % based on the total ingredients may be added to the initial mixture. The mixing may occur in conventional apparatus or within the confines of a reactive extruder or continuous reactive injection molding machine.

Alternatively, the polyurethanes may be prepared by the prepolymer method which involves reacting a diisocyanate with the polycarbonate to form a prepolymer having terminally reactive diisocyanate groups. The prepolymer is then reacted with a chain extender.

Thus, the polyurethane elastomeric composition of the present invention may be further defined as comprising a reaction product of:
(i) a silicon-based polycarbonate of the formula (I) defined above where $R_7$ is a divalent linking group or an optionally substituted straight chain, branched or cyclic, saturated or unsaturated hydrocarbon radical;
(ii) a diisocyanate; and
(iii) a chain extender.

Preferably, the diisocyanate is selected from 4,4'-methylenediphenyl diisocyanate (MDI), methylene bis (cyclohexyl) diisocyanate (H12MDI), p-phenylene diisocyanate (p-PDI), trans-cyclohexane-1, 4-diisocyanate (CHDI) or a mixture of the cis and trans isomers, 1,6-hexamethylene diisocyanate (DICH), 2,4-toluene diisocyanate (2,4-TDI) or its isomers or mixtures thereof, p-tetramethylxylene diisocyanate (p-TMXDI) and m-tetramethylxylene diisocyanate (m-TMXDI). MDI is particularly preferred.

The chain extender is preferably selected from 1,4butanediol, 1,6-hexanediol, 1,8-octanediol, 1,9-nonanediol, 1,10-decanediol 1,4-cyclohexane dimethanol, p-xyleneglycol,

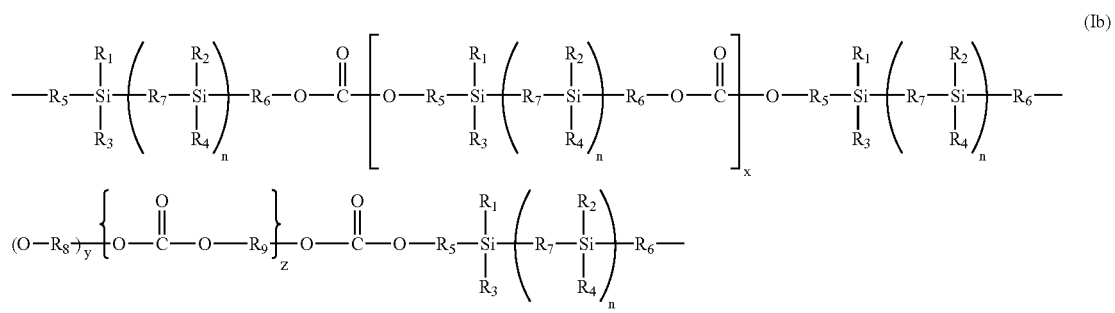

(Ib)

wherein $R_1$ to $R_9$, n, y, x and z are as defined in formula (I) above.

The polycarbonate of the present invention is particularly useful in preparing polyurethane elastomeric compositions.

1,4-bis (2-hydroxyethoxy) benzene and 1,12-dodecanediol. 1,4-butanediol is particularly preferred.

A particularly preferred polyurethane elastomeric composition of the present invention comprises a reaction product of:

(i) compounds of the formula (Ia) wherein $R_1$, $R_2$, $R_3$ and $R_4$ are methyl, $R_8$ is ethyl, $R_9$ is hexyl, $R_5$ and $R_6$ are propyl or butyl and $R_7$ is O or —$CH_2$—$CH_2$—;

(ii) MDI; and (iii) 1,4-butanediol.

An advantage of the incorporation of the polycarbonate segment is the relative ease of processing of the polyurethane by conventional methods such as extrusion, injection and compression moulding without the need of added processing waxes. If desired, however, conventional polyurethane processing additives such as catalysts, antioxidants, stabilizers, lubricants, dyes, pigments, inorganic and/or organic fillers and reinforcing materials can be incorporated into the polyurethane during preparation. Such additives are preferably added to the polycarbonate.

The polycarbonate, diisocyanate and chain extender may be present in certain proportions. The preferred level of hard segment (i.e., diisocyanate and chain extender) in the composition is about 30 to about 60 wt %, more preferably 40 to 50 wt %.

The polyurethane elastomeric composition of the present invention is particularly useful in preparing materials having good mechanical properties, in particular biomaterials.

According to another aspect of the present invention there is provided a material having improved mechanical properties, clarity, processability and/or degradation resistance comprising a polyurethane elastomeric composition which includes a polycarbonate segment of the formula (Ib) defined above.

The present invention also provides use of the polyurethane elastomeric composition defined above as a material having improved mechanical properties, clarity, processability and/or degradation resistance.

The present invention further provides the polyurethane elastomeric composition defined above when used as a material having improved mechanical properties, clarity, processability and/or degradation resistance.

The mechanical properties which are improved include tensile strength, tear strength, abrasion resistance, Durometer hardness, flexural modulus and related measures of flexibility or elasticity.

The improved resistance to degradation includes resistance to free radical, oxidative, enzymatic and/or hydrolytic processes and to degradation when implanted as a biomaterial.

The improved processability includes ease of processing by casting such as solvent casting and by thermal means such as extrusion and injection molding, for example, low tackiness after extrusion and relative freedom from gels.

There is also provided a degradation resistant material which comprises the polyurethane elastomeric composition defined above.

The polyurethane elastomeric composition of the present invention shows good elastomeric properties. It should also have a good compatibility and stability in biological environments, particularly when implanted in vivo for extended periods of time.

According to another aspect of the present invention there is provided an in vivo degradation resistant material which comprises the polyurethane elastomeric composition defined above.

The polyurethane elastomeric composition may also be used as a biomaterial. The term "biomaterial" is used herein in its broadest sense and refers to a material which is used in situations where it comes into contact with the cells and/or bodily fluids of living animals or humans.

The polyurethane elastomeric composition is therefore useful in manufacturing medical devices, articles or implants.

Thus, the present invention still further provides medical devices, articles or implants which are composed wholly or partly of the polyurethane elastomeric composition defined above.

The medical devices, articles or implants may include cardiac pacemakers and defibrillators, catheters, cannulas, implantable prostheses, cardiac assist devices, heart valves, vascular grafts, extra-corporeal devices, artificial organs, pacemaker leads, defibrillator leads, blood pumps, balloon pumps, A–V shunts, biosensors, membranes for cell encapsulation, drug delivery devices, wound dressings, artificial joints, orthopaedic implants and soft tissue replacements.

It will be appreciated that polyurethane elastomeric compositions having properties optimised for use in the construction of various medical devices, articles or implants will also have other non-medical applications. Such applications may include their use in the manufacture of artificial leather, shoe soles; cable sheathing; varnishes and coatings; structural components for pumps, vehicles, etc; mining ore screens and conveyor belts; laminating compounds, for example in glazing; textiles; separation membranes; sealants or as components of adhesives.

It will also be understood that the siloxane component of the polyurethane elastomeric composition by virtue of its dielectric properties will provide opportunities for use in electronic and electrical components and insulation.

Thus, the present invention extends to the use of the polyurethane elastomeric composition defined above in the manufacture of devices or articles.

The present invention also provides devices or articles which are composed wholly or partly of the polyurethane elastomeric composition defined above.

The invention will now be described with reference to the following examples. These examples are not to be construed as limiting the invention in any way.

In the examples, reference will be made to the accompanying drawings in which:

FIG. 1 shows differential scanning calorimetry (DSC) thermograms of polycarbonate macrodiols (a) 1,6-hexandiol based commercial polycarbonate, (b) macrodiol of Example 2 and (c) macrodiol of Example 1; and FIG. 2 shows DSC thermograms demonstrating well phase separated morphologies of polyurethanes based on silicon containing macrodiols (i) PU-1 based on a commercial polycarbonate macrodiol, (ii) PU-2 from macrodiol in Example 2 and (iii) PU-3 from macrodiol in Example 1.

EXAMPLE 1

Ethylene carbonate (50 g), 1,6-hexanediol (25 g), stannous-2-ethyl-hexanoate (0.13 g) and 1,3-bis(4-hydroxybutyl)-1,1,3,3-tetramethyldisiloxane (25 g) were placed in a 250 ml three-necked round bottom flask. The flask was then fitted with a fractionation column (filled with glass beads), distillation head, magnetic stirrer bar, condenser, nitrogen inlet and thermometer. The polymerisation was carried out in three stages. In the first stage, the reaction mixture was heated to 180° C. under a nitrogen flow while maintaining a vacuum of 140 mmHg over a period of about 4 h. In the second stage, the reaction temperature was raised to 190° C. while increasing the vacuum to 50 mmHg and the reaction was continued for 2 more hours. During this period, the vacuum was reduced to 10 mmHg, stepwise. About 75% of the total distillate was collected during the second stage. In the third stage, the temperature was raised to 200° C., the vacuum reduced to 5 mmHg with the nitrogen flow stopped and the reaction was continued for a further 30 min. The reaction was stopped at the end of the third stage by removing the flask from the heating bath and allowing to cool to room temperature under ambient pressure. The progress of the polymerisation reaction was monitored by analysing a sample of the crude product by $^1$H-NMR spectroscopy and by size exclusion chromatography. The product polymer was a pale yellow viscous liquid. Yield of the crude polymer was 44.5 g.

The crude macrodiol was dissolved in dichloromethane to make a 15% solution and treated with charcoal to remove coloured impurities as well as the catalyst residues. The macrodiol obtained after evaporating the dichloromethane from the filtered solution was further purified by washing with boiling water to remove traces of ethylene glycol and unreacted ethylene carbonate. Boiling water (200 ml) was added to the polymer and stirred for 10 min, allowed to settle and the water was decanted off. This process was repeated three times. The final polymer was then dried at 80° C. under vacuum (0.1 mmHg) for 15 h. The final yield was 40 g. The molecular weight of the macrodiol based on the hydroxyl number was 1220. The macrodiol was also analysed by DSC and the results are shown in FIG. 1.

EXAMPLE 2

A procedure similar to that in example 1 was followed, except that the polymerisation was carried out using ethylene carbonate and 1,3-bis(4-hydroxybutyl)-1,1,3,3-tetramethyldisiloxane (25 g). The product copolycarbonate macrodiol was isolated and purified by the procedure used in Example 1. The yield of the macrodiol was 18 g and the molecular weight based on hydroxyl number was 874. The macrodiol was also analysed by DSC and the results are shown in FIG. 1.

EXAMPLE 3

Three polyurethanes were prepared from 1,6-hexanediol based commercial polycarbonate macrodiol and the macrodiols obtained in examples 2 and 1. The polyurethanes were labelled PU-1, PU-2 and PU-3, respectively. Details of the typical one-step polymerisation procedure used to prepare the polyurethanes is described below.

The pre-dried macrodiol prepared in Example 1 (25.00 g, MW 1220), 1,4-butanediol (3.055 g) and stannous 2-ethylhexanoate (0.004 g, 0.01-wt % of total solids) were placed in a 250 ml polypropylene beaker and degassed at 80° C. in an oven under a vacuum of 2 mmHg for 1.5 h. Molten MDI (13.61 g) was weighed into a MDI wet tared 50 ml polypropylene beaker and quickly poured into the macrodiol mixture while rapidly stirring with a stainless steel spatula, under a nitrogen blanket. After stirring for 30 sec, the viscous polymer was poured onto a teflon coated metal pan and cured at 100° C. (4 h) in an oven under dry nitrogen. All three polyurethanes were analysed by DSC and the results are shown in FIG. 2. Tensile test results are shown in Table 1 below.

TABLE 1

| Polyurethane | Hardness (Shore A) | Fail Stress (MPa) | Fail Strain (%) | Stress at 100% Elongation (MPa) | Youngs Modulus (MPa) |
|---|---|---|---|---|---|
| PU-1 | 85 | 40 | 180 | 20.1 | 144 |
| PU-2 | 68 | 20 | 450 | 9.5 | 31 |
| PU-3 | 74 | 33 | 300 | 13 | 31 |

References
1. Yu et al., *J. Polym. Sci Phys. Ed.*, 23, p 2319 (1985).
2. Speckhard et. al., *Rubber Chem. Technol.*, 59, p 405 (1986).
3. Awater et al., *Polyurethane Handbook,* 2nd ed, G. Oertel Ed., pp 22 and 67, (1993).
4. Braun et al., *Journal of Organic Chemistry,* Vol 332, pp 63–68, (1987).
5. Eckert et al., *Comprehensive Organic Functional Group Transformations*, Kastritzky et al., Ed., Vol 6, pp 460–471 (1995).

It will be appreciated that further modifications and alterations may be made to the embodiment described above without departing from the scope or spirit of the present invention.

The invention claimed is:
1. A polyurethane elastomeric composition which includes a silicon-based polycarbonate segment of the formula (Ib):

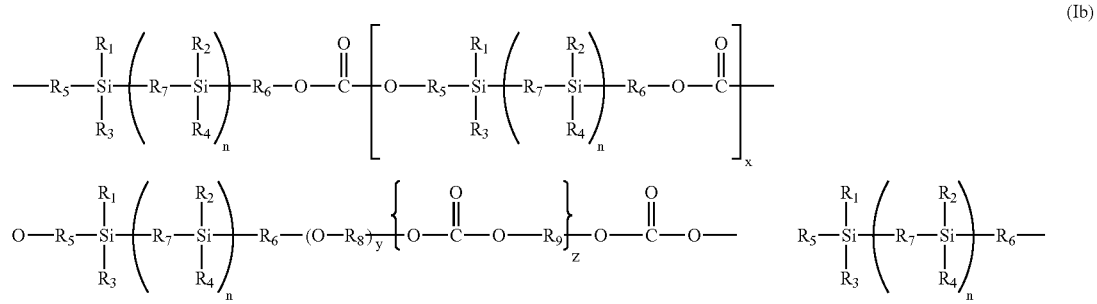

wherein
- $R_1$, $R_2$, $R_3$ and $R_4$, are the same or different and are hydrogen or an optionally substituted straight chain, branched or cyclic, saturated or unsaturated hydrocarbon radical;
- $R_5$, $R_6$, $R_8$ and $R_9$ are the same or different and are a straight chain, branched or cyclic, saturated or unsaturated hydrocarbon radical;
- $R_7$ is a divalent linking group or an optionally substituted straight chain, branched or cyclic, saturated or unsaturated, hydrocarbon radical;
- n, y and z are integers of 0 or more; and
- x is an integer of 0 or more; provided that z is an integer of 1 or more.

2. A polyurethane elastomeric composition comprising a reaction product of:

(i) a silicon-based polycarbonate of the formula (I)

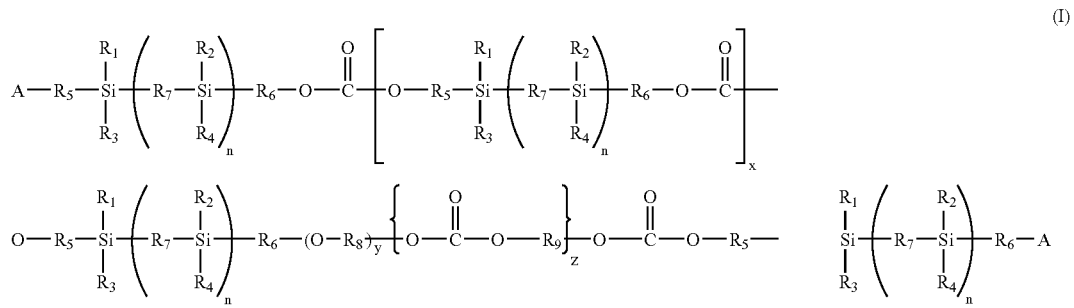

(i) a silicon-based polycarbonate of the formula (I)

wherein
- $R_1$, $R_2$, $R_3$ and $R_4$, are the same or different and are hydrogen or an optionally substituted straight chain, branched or cyclic, saturated or unsaturated hydrocarbon radical;
- $R_5$, $R_6$, $R_8$ and $R_9$ are the same or different and are a straight chain, branched or cyclic, saturated or unsaturated hydrocarbon radical;
- $R_7$ is a divalent linking group O, S, NR wherein R is hydrogen or an optionally substituted straight chain, branched or cyclic, saturated or unsaturated, hydrocarbon radical, or an optionally substituted straight chain, branched or cyclic, saturated or unsaturated hydrocarbon radical;
- A is an endcapping group;
- n, y and z are integers of 0 or more; and
- x is an integer of 0 or more; provided that z is an integer of 1 or more;

(ii) a diisocyanate; and (iii) a chain extender.

3. The polyurethane elastomeric composition as claimed in claim 2 wherein the diisocyanate is selected from 4,4'-methylenediphenyl diisocyanate (MDI), methylene bis (cyclohexyl) diisocyanate (H12MDI), p-phenylene diisocyanate (p-PDI), trans-cyclohexane-1,4-diisocyanate (CHDI) or a mixture of the cis and trans isomers, 1,6-hexamethylene diisocyanate (DICH), 2,4-toluene diisocyanate (2,4-TDI) or its isomers or mixtures thereof; p-tetramethylxylene diisocyanate (p-TMXDI) and m-tetramethylxylene diisocyanate (m-TMXDI).

4. The polyurethane elastomeric composition as claimed in claim 2 wherein the chain extender is selected from 1,4-butanediol, 1,6-hexanediol, 1,8-octanediol, 1,9-nonanediol, 1,10-decanediol 1,4-cyclohexane dimethanol, p-xyleneglycol, 1,4-bis (2-hydroxyethoxy) benzene and 1,12-dodecanediol.

5. A polyurethane elastomeric composition comprising a reaction product of:

(i) a silicon based polycarbonate of the formula (Ia):

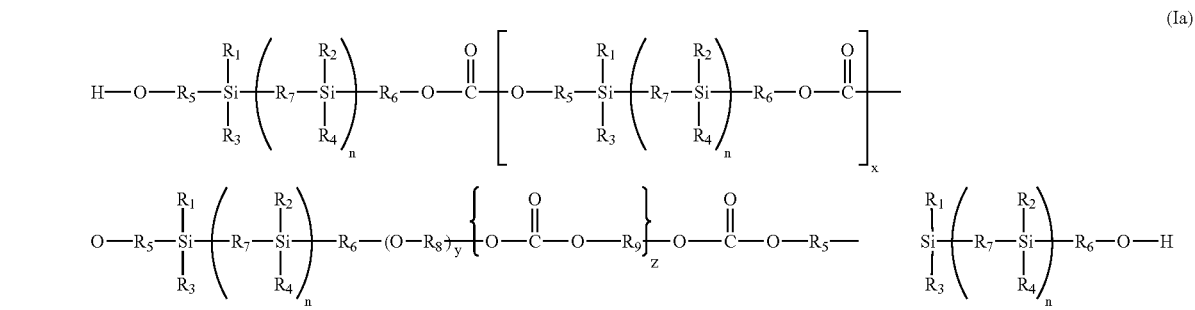

wherein $R_1$, $R_2$, $R_3$ and $R_4$ are methyl; $R_8$ is ethyl; $R_9$ is hexyl; $R_5$ and $R_6$ are propyl or butyl; $R_7$ is O or —$CH_2$—$CH_2$—; and n, x and y are integers of 0 or more;

provided z is an integer of 1 or more;

(ii) 4,4'-methylenediphenyl diisocyanate; and (iii) 1,4-butanediol.

6. A material having improved mechanical properties, clarity, processability and/or degradation resistance comprising a polyurethane elastomeric composition which includes a polycarbonate segment of the formula (Ib) as defined in claim 1.

7. Medical devices, articles or implants which are composed wholly or partly of the polyurethane elastomeric composition defined in claim 1.

8. Medical devices, articles or implants of claim 7 wherein said medical devices, articles or implants are cardiac pacemakers, defibrillators, catheters, heart valves, cardiac assist devices, vascular grafts or implantable prostheses.

9. A material having improved mechanical properties; clarity, processability and/or degradation resistance comprising a polyurethane elastomeric composition as defined in claim 1.

10. Medical devices, articles, or implants of claim 7 wherein said medical devices, articles, or implants are cannulas, extra-corporeal devices, artificial organs, pacemaker leads, defibrillator leads, blood pumps, balloon pumps, A-V shunts, biosensors, membranes for cell encapsulation, drug delivery devices, wound dressings, artificial joints, orthopaedic implants, or soft tissue replacements.

11. A device or article which is composed wholly or partly of the polyurethane elastomeric composition as defined in claim 1.

12. A device or article according to claim 11 which is selected from artificial leather, shoe soles, cable sheathing, varnishes, coatings, structural components for pumps or vehicles, mining ore screens, conveyor belts, laminating compounds, textiles, separation membranes, sealants, and adhesive components.

* * * * *